United States Patent Office 3,135,717
Patented June 2, 1964

3,135,717
PROCESS OF FORMING GRAFT COPOLYMERS OF POLYSTYRENE AND POLYVINYL CHLORIDE
Razmic S. Gregorian, Silver Spring, Md., and Patrick J. Conway, Rutherford, N.J., assignors to W. R. Grace & Co., Clarksville, Md., a corporation of Connecticut
No Drawing. Filed Feb. 10, 1960, Ser. No. 7,759
5 Claims. (Cl. 260—45.5)

This invention relates to a novel method of preparing graft copolymers. More particularly, the invention is concerned with grafting a living polymer, polymerized by an anionic mechanism, onto a halogenated polymer wherein at least at portion of the halogen atoms are of the type that react with alkali metals to yield alkali metal halides.

The formation of living polymers is old in the art. See J. Amer. Chem. Soc. vol. 78, page 2656 (1956) M. Szwarc et al. wherein the use of a sodium-naphthalene complex as a catalyst to polymerize styrene results in a polymerization reaction which does not terminate and which on consumption of all the monomer yields a living polymer. Said living polymer will continue polymerization with the charging of additional monomer and will even form block copolymers with the addition of certain other monomers, e.g. isoprene, which polymerize by an anionic mechanism.

Although living polymers are able to form block copolymers with certain other monomers one of the problems is how to form copolymers with other materials which are either already in polymeric form or do not polymerize by an anionic mechanism.

Surprisingly, it has now been found that when the living polymer has an alkali metal attached thereto, the alkali metal will react with halogen atoms in halogenated polymers to form an alkali metal halide and thereby cause the formation of graft copolymers.

Summarily this invention is directed to forming graft copolymers by the process of polymerizing in an inert solvent a monomer capable of forming a living polymer by an anionic mechanism in the presence of an organo-alkali metal-containing catalyst, admixing said living polymer-containing solution with a separate portion of the aforesaid inert solvent having dissolved therein a halogenated polymer wherein at least a portion of the halogen atoms are of the type that can be displaced by an alkali metal, and recovering a copolymer comprising the aforementioned halogenated polymer with the living polymer grafted thereto.

The following examples will aid in understanding the invention but will in no way limit its scope.

EXAMPLE 1

*Catalyst Preparation*

A three-necked 1 liter flask equipped with stirrer, and situated in a $H_2O$ bath was dried, flushed with nitrogen and charged with 0.70 g. lithium (approx. 0.1 mole). 7.84 g. bromobenzene was dispersed in 30 ml. of tetrahydrofuran and thereafter added dropwise to the flask with agitation. The exothermic reaction, i.e.

$$\phi Br + 2Li \rightarrow \phi Li + LiBr$$

was cooled by the water bath. The resulting phenyl lithium catalyst remained in solution and lithium bromide precipated therefrom.

EXAMPLE 2

*Polymerization of the Living Polymer*

10 g. vacuum distilled styrene monomer were dissolved in 200 ml. tetrahydrofuran and added dropwise to the catalyst solution in the three-necked flask in Example 1. An immediate exotherm ensued from the following reaction:

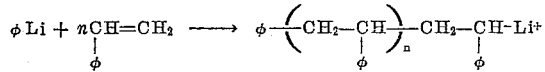

The characteristic red colored solution of a living styrene polymer resulted.

EXAMPLE 3

*Preparation of a Graft Copolymer*

5 g. commercial polyvinyl chloride, which was reprecipitated from tetrahydrofuran and dried in a vacuum oven, was charged under a nitrogen blanket to a 1 liter three-necked flask containing 300 ml. tetrahydrofuran which had been distilled from sodium. After the vinyl chloride polymer dissolved in the tetrahydrofuran solvent, the red colored solution from Example 2 was transferred to the polyvinyl chloride solution in the absence of air and moisture under a $N_2$ blanket. The red colored solution changed to pale yellow on mixing with the polyvinyl chloride solution. The reaction proceeded as follows:

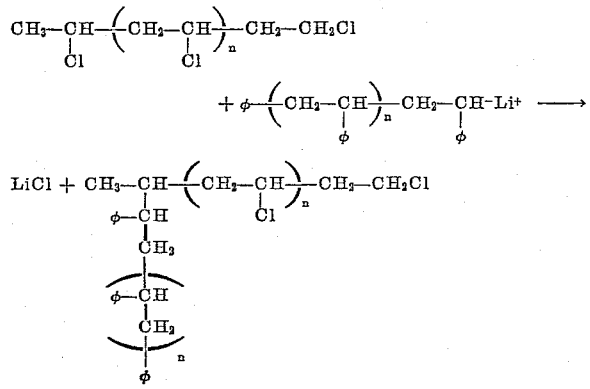

where $n$ is any integer. After 10 minutes, the solution was poured into 500 cc. methanol to precipitate the product. The product was washed with excess methanol and water. The product was dried and extracted with benzene thereby separating the product into a benzene-soluble portion and a benzene-insoluble portion. The benzene insoluble portion after drying weighed 6.8 g. and had a softening point of 125–130° C. The benzene-insoluble portion was then dissolved in 100 cc. tetrahydrofuran and cast as a film therefrom at room temperature. An infrared spectrum of the thus cast film had the adsorption characteristics of both polystyrene and polyvinyl chloride. This was determined by running infra-red spectra on films of polystyrene and polyvinyl chloride cast in the above manner. Characteristics of both curves were found in the graft polystyrene-polyvinyl chloride copolymer.

The grafting reaction is readily carried out at room temperature. Higher or even lower temperatures may be employed but are not necessary. In addition, substantially atmospheric pressure is operable in performing this invention.

The present invention is carried out in an inert atmosphere. A blanket of an inert gas e.g. nitrogen is maintained throughout the reactions to insure the exclusion of contaminants such as moisture and air. Such contaminants have a deleterious effect on the catalyst and kill the living polymer.

The organo-alkali metal catalyst of the instant invention has the general formula RM wherein M is an alkali metal and R is an alkyl, aryl or aralkyl. Preferably, lithium is used as the alkali metal due to its greater catalytic reactivity. Examples of operable catalysts include phenyl lithium, butyl lithium and sodium naphthalene.

The mole ratio of the organo-alkali metal catalyst to the polymerizable monomer is not critical. Since the molecular weight of the polymer formed in the presence of the anionic mechanism catalyst varies inversely with the amount of catalyst utilized, the factor determining the amount of catalyst to be employed (i.e. catalyst:monomer ratio) will be the desired length of the polymer chain to be grafted onto the halogenated polymer. Thus should it be desirous to graft on long chains of polymer a catalyst:monomer mole ratio of 1:1000 or more would be utilized and for short chain grafts a catalyst:monomer mole ratio of 1:2 or even less would be employed.

The present invention is operable with monomers which polymerize by an anionic mechanism. Such monomers after polymerization in the presence of the organo-alkali metal catalyst are readily grafted onto halogenated polymers containing halogens which react with the alkali metal. Examples of monomers which polymerize by an anionic mechanism include styrene, nitroethylene, 2-nitropropylene, 1 chloronitroethylene, alkyl acrylates, acrylamides, acrylonitrile, vinyl ketone, vinyl carbazole, butadiene, isoprene and vinylidene cyanide.

Halogenated polymers susceptible to grafts in accordance with the instant invention are varied. Preferably the halogen best suited to react with the alkali metal and thereby permit grafting is bromine. Polyvinyl chloride, brominated butyl rubber, polychloroprene, halogenated polyethylene, halogenated polypropylene, and copolymers thereof are some the many halogenated polymers operable in this invention.

The anionic mechanism polymerization can be performed by bulk or solution polymerization techniques. If bulk polymerization is used the reaction is not carried to completion so that the halogenated polymer solution can be readily admixed therewith. Preferably the polymerization is performed in the presence of a solvent i.e. solution polymerization.

The solvent used in the practice of this invention is one which is inert and does not interfere with either the monomer to be polymerized, the catalyst employed, the growing polymer chain or the halogenated polymer. Preferred inert solvents are tetrahydrofuran and 1,4 dioxane.

The graft copolymers formed by the instant invention have many and varied uses, e.g. internal plasticization of polyvinyl chloride, molded articles, film and resin.

We claim:

1. The process of forming a graft copolymer said graft copolymer being further characterized as being composed of polyvinyl chloride having chemically bonded thereto side chains consisting of homopolymeric styrene which comprises polymerizing styrene monomer in an inert atmosphere in the presence of a catalyst consisting essentially of phenyl lithium and admixing in an inert atmosphere the thus formed polymer with an inert solvent having dissolved therein polyvinyl chloride.

2. The process of claim 1 wherein the styrene polymerization is performed in an inert solvent.

3. The process of claim 2 wherein the inert solvent is tetrahydrofuran.

4. The process of forming a graft copolymer said graft copolymer being further characterized as being composed of polyvinyl chloride having chemically bonded thereto side chains consisting of homopolymeric styrene which comprises in an inert atmosphere polymerizing styrene monomer at atmospheric pressure and at room temperature in an inert tetrahydrofuran solvent in the presence of a catalyst consisting essentially of phenyl lithium, in a monomer-catalyst mole ratio of 2:1 respectively and admixing in an inert atmosphere the polystyrene containing solution with a separate portion of an inert tetrahydrofuran solution having dissolved therein polyvinyl chloride.

5. The process according to claim 4 wherein the graft copolymer is recovered by precipitating a polymeric product from said admixed solutions with methanol, washing and drying said precipitated polymeric product and extracting the thus dried polymeric product with benzene to provide a graft copolymer characterized as being composed of polyvinyl chloride having chemically bonded thereto side chains consisting of homopolymeric styrene.

References Cited in the file of this patent

UNITED STATES PATENTS

| 2,449,684 | Bacon et al. | Sept. 21, 1948 |
| 2,566,791 | Chaban | Sept. 4, 1951 |
| 2,837,496 | Vandenberg | June 3, 1958 |

FOREIGN PATENTS

| 679,562 | Britain | Sept. 17, 1952 |
| 555,261 | Canada | Apr. 1, 1958 |

OTHER REFERENCES

Szwarc et al.: Journal of Polymer Science, vol. XXII, Issue No. 100 (1956), pages 189–191.